Patented Jan. 14, 1930

1,743,659

UNITED STATES PATENT OFFICE

HENRY DREYFUS, OF LONDON, ENGLAND

MANUFACTURE OF ACETIC ACID

No Drawing. Application filed May 27, 1926, Serial No. 112,165, and in Great Britain June 13, 1925.

This invention relates particularly to the production of acetic acid or mixtures of acetic acid and acetone from methyl alcohol. It is also applicable for the production of acetone from methyl alcohol.

According to the present invention I have found that when methyl alcohol is heated together with carbon monoxide under pressure, preferably in the presence of certain catalysts, it can be transformed into acetic acid. The carbon monoxide may be employed in about the proportion corresponding to the reaction, say about equi-molecular proportion, or in excess.

The catalysts which are employed for the production of acetic acid alone or in conjunction with acetone according to the present invention are substances that are, or are capable of forming, acetates which split off acetic acid with or without acetone at temperatures under 400° C., or at most 450° C. and preferably between about 200° and 300° C. Such catalysts may be employed alone or in mixture with other catalysts. By employing such catalysts or catalyst mixtures the methyl alcohol and carbon monoxide can be combined and acetic acid be split off or evolved continuously with regeneration of the catalysts.

Catalysts which favor the production of methane or more than traces of methane are to be avoided.

Some catalysts which may be employed are for example copper oxide, tin oxide, lead oxide, copper acetate, zinc oxide, zinc acetate, zinc methylate, aluminium methylate, tin methylate and like methylates, or mixtures of two or more of any of the foregoing with each other or mixtures of any of them with more basic materials such as potassium acetate or sodium acetate. Mixtures of or containing one or more of the foregoing, for instance, the said metal methylates, with one or more alkali methylates such as potassium methylate or sodium methylate, may also be used.

In carrying out the process one may employ temperatures below 350° C., or at most 450° C., and preferably between about 200° and 300° C., and pressures which may be up to 200 atmospheres or more, variable according to the catalysts used, but generally pressures of about 50 to 150 atmospheres.

If, instead of employing substances or catalysts which are, or are capable of forming acetates which decompose with formation of acetic acid under the action of heat, substances are used which are, or form acetates which decompose to form acetone alone or in substantial quantities under the action of heat, a continuous production of acetone can take place, and the present invention likewise includes such a modified process.

What I claim and desire to secure by Letters Patent is:—

1. A process for the manufacture of acetic acid, which comprises heating methyl alcohol together with carbon monoxide under pressure in the presence of a catalyst selected from the group comprising metal acetates which decompose with the formation of acetic acid at a temperature under substantially 450° C. and metal compounds capable of forming said acetates.

2. A process for the manufacture of acetic acid, which comprises heating methyl alcohol together with carbon monoxide under pressure at a temperature between 100° to 450° C., in the presence of a catalyst selected from the group comprising metal acetates which decompose with the formation of acetic acid at a temperature under substantially 450° C., and metal compounds capable of forming said acetates.

3. A process for the manufacture of acetic acid, which comprises heating methyl alcohol together with carbon monoxide under pressure at a temperature between 200° and 300° C. in the presence of a catalyst selected from the group comprising metal acetates which decompose with the formation of acetic acid at a temperature between substantially 200° and 300° C., and metal compounds capable of forming said acetates.

4. A process for the manufacture of acetic acid, which comprises heating methyl alcohol together with carbon monoxide under a pressure not exceeding 200 atmospheres in the presence of a catalyst selected from the group comprising metal acetates which decompose with the formation of acetic acid at a temperature under substantially 450° C., and metal compounds capable of forming said acetates.

5. A process for the manufacture of acetic acid, which comprises heating methyl alcohol together with carbon monoxide under a pressure between 50 and 150 atmospheres in the presence of a catalyst selected from the group comprising metal acetates which decompose with the formation of acetic acid at a temperature under substantially 450° C., and metal compounds capable of forming said acetates.

6. A process for the manufacture of acetic acid, which comprises heating methyl alcohol together with carbon monoxide under a pressure not exceeding 200 atmospheres and at a temperature between 100° and 400° C. in the presence of a catalyst selected from the group comprising metal acetates which decompose with the formation of acetic acid at a temperature under substantially 400° C., and metal compounds capable of forming said acetates.

7. A process for the manufacture of acetic acid, which comprises heating methyl alcohol together with carbon monoxide under a pressure between 50 and 150 atmospheres, and at a temperature between 200° and 300° C., in the presence of a catalyst selected from the group comprising metal acetates which decompose with the formation of acetic acid at a temperature between substantially 200° and 300° C., and metal compounds capable of forming said acetates.

In testimony whereof I have hereunto subscribed my name.

HENRY DREYFUS.